No. 827,776. PATENTED AUG. 7, 1906.
R. H. YALE.
SEAT BACK FOR DRIVERS' SEATS.
APPLICATION FILED JUNE 21, 1905.
2 SHEETS—SHEET 1.
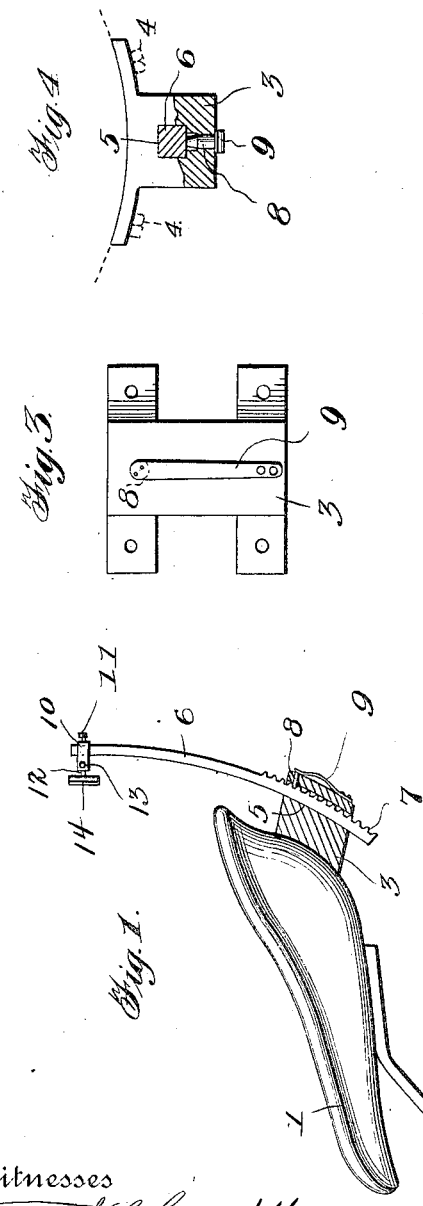
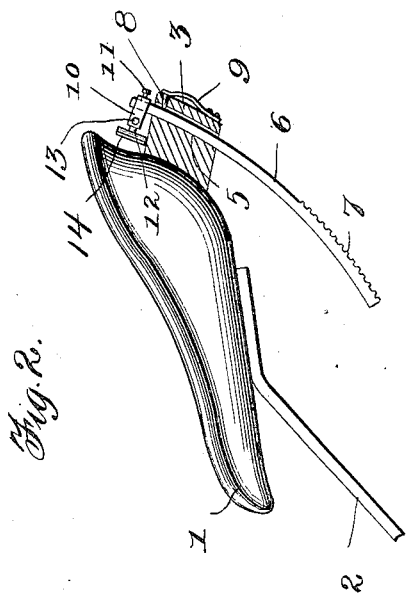
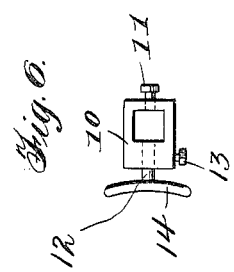
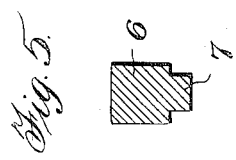
Witnesses
Frank G. Campbell.
C. W. Klapprott
Inventor
Rodney H. Yale,
By Frank A. Spencer Attorney

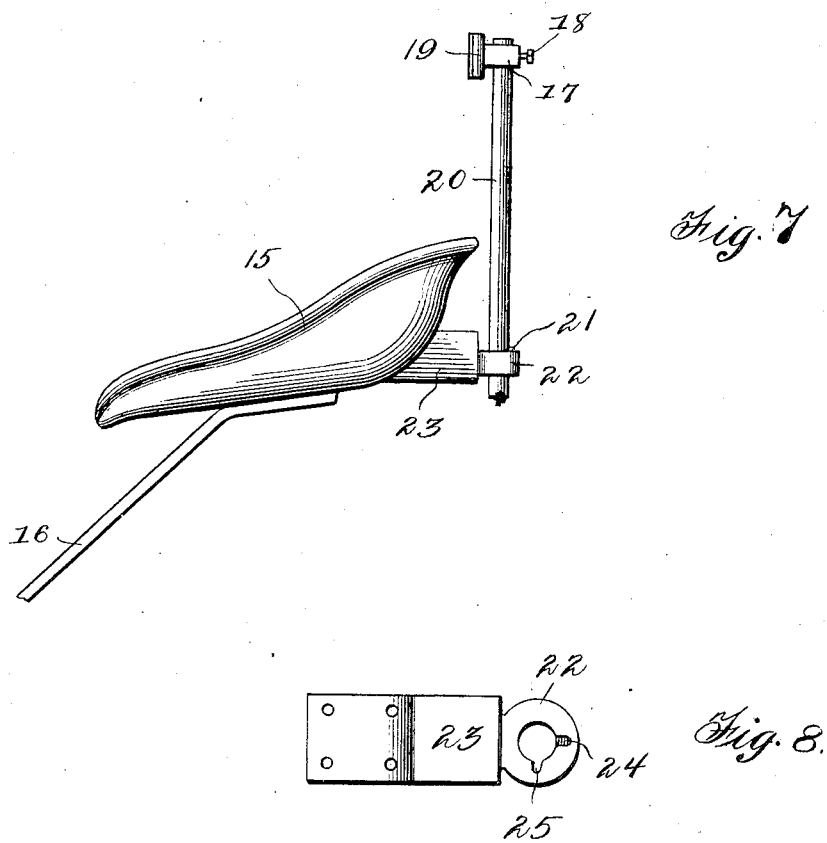

UNITED STATES PATENT OFFICE.

RODNEY H. YALE, OF BEATRICE, NEBRASKA.

SEAT-BACK FOR DRIVERS' SEATS.

No. 827,776.

Specification of Letters Patent.

Patented Aug. 7, 1906.

Application filed June 21, 1905. Serial No. 266,296.

*To all whom it may concern:*

Be it known that I, RODNEY H. YALE, a citizen of the United States, residing at Beatrice, in the county of Gage and State of Nebraska, have invented certain new and useful Improvements in Seat-Backs for Drivers' Seats, of which the following is a specification.

My invention relates to improvements in adjustable seat-backs and supports for same for the drivers' seats in wheeled agricultural implements or other like vehicles, and is intended to aid to provide a seat-back which shall promotehet comfort and convenience of the driver and which shall be capable of quick adjustment into either operative or inoperative position.

The seats of such implements are usually mounted or vacated by the operator at the side or rear, and it is therefore of importance that the seat-back should be easily removable, so as not to obstruct the movements of such operator in mounting or dismounting, also that the adjustment into operative position should be quickly made when desired.

In the accompanying drawings, Figure 1 is a side view, partly in section, of the preferred form of the device attached to the driver's seat in an agricultural implement. Fig. 2 is a similar view with the seat-back in inoperative position. Fig. 3 is a rear elevation of the casting or block attached to the back part of the seat and in which the standard which carries and supports the seat-back proper is adjustably mounted. Fig. 4 is a top view, partly in section, of said casting and connected parts. Fig. 5 is a cross-section of the standard through the serrated portion thereof. Fig. 6 is a top plan view of a collar which is mounted on the upper end of the standard and of the pad or seat-back proper carried by said standard. Fig. 7 is a side view of a modified form of the device. Fig. 8 is a top plan view of the block and supporting-collar attached to the rear of the seat. Fig. 9 is a side view of the device as in Fig. 7, shown in its inoperative position.

Referring to the preferred form, the numeral 1 indicates the driver's seat in a wheeled agricultural implement mounted on the usual supporting-bar 2. Such seats are usually formed of a single piece of pressed steel, but may be of cast metal or other material. To the rear of said seat a casting or block 3 is attached, preferably by means of bolts 4. Extending downwardly through said casting is a forwardly-inclined and preferably slightly-curved recess or passage-way 5, substantially rectangular in cross-section, as shown in Fig. 4, through which is adapted to pass a standard 6, also slightly curved and formed to fit the passage-way 5. Said standard is provided, preferably on the rear face of its lower portion, with a series of serrations 7, forming substantially a rack-bar, with which a detent 8, mounted on a spring 9, is adapted to engage to hold the standard and seat-back at any desired elevation. The rear face of standard 6 is also provided with shoulders, as seen in Fig. 5, preferably on each side of the serrations 7, which bear against corresponding shoulders on the rear wall of recess 5, as seen in Fig. 4, which shoulders furnish a bearing-surface upon which standard 6 slides when it is raised or lowered and which protect the serrations on the standard.

The adjustment of the detent with the serrations 7 is such that the standard 6 may be forced downward or drawn upward through the recess 5 by simple pressure or tension without the necessity of any special manipulation of the spring-detent, the latter sliding over the serrations when pressure is applied in either direction.

On the upper portion of standard 6 is mounted a collar 10, which incloses the standard 6 and is adjustable thereon vertically by means of a set-screw 11. The front portion of the collar 10 carries a sliding pin 12, which is adjustable longitudinally in a recess in said collar by means of a set-screw 13. The pin 12 carries the pad or seat-back proper, 14, which may be of any preferred form or construction suitable for the purpose.

The inclination of the recess 5 in the block 3 is such that when the seat-back is pushed downwardly into its inoperative position the pad 14 will occupy a position directly behind the seat and just below its upper edge or rim, as seen in Fig. 2, and the lower portion of the curved standard will be carried forward under the seat.

Referring to Figs. 7, 8, 9, the numeral 15 indicates the same kind of driver's seat as is described in connection with the preferred form in Fig. 1, mounted on its supporting-bar 16.

17, 18, and 19 represent, respectively, a similar collar, set-screw, and seat-back or back-pad such as are mentioned in connection with Fig. 1.

20 represents a rounded or tubular standard carrying the collar 17 and back-pad 19 and is provided with the small rounded projection 21 on one side, near its lower end. Said standard is inclosed in the collar 22, which is securely attached to and preferably an integral part of block 23, this block being attached to the rear of the seat, preferably with rivets or bolts. Said collar 22 has a notch 24 to receive the rounded projection 21 and also is provided with a groove 25 to permit said projection to pass freely through the collar when it is desired to lower the standard.

When the standard is in operative position, projection 21 rests securely in the notch 24, providing a safe and proper support for the back-pad.

When it is desired to lower the standard, it is lifted slightly to remove projection 21 from notch 24, and it is then turned sufficiently to permit the projection to pass downward through the groove 25. After the said projection has passed through the collar 22 the standard can be turned in any desired direction, and, if preferred, the seat-pad can be turned in on top of the block 23, where it would be entirely out of the way of the driver in mounting or dismounting, as shown in Fig. 9.

I claim as new and desire to secure by Letters Patent—

1. A seat-back for drivers' seats comprising a bearing-block on the seat, having a downwardly and forwardly extending recess therein, a curved standard mounted to slide in said recess, serrations and a spring-detent for limiting the movements of said standard, and a pad adjustably secured on the upper portion of said standard, said serrations and detent being adapted to engage and disengage when the standard is raised or lowered, without manipulation of the detent.

2. A seat-back for drivers' seats comprising a bearing member on the rear of the seat, having a downwardly and forwardly inclined recess therein, said recess having shoulders on its rear wall, a curved standard mounted to slide in said recess and provided with shoulders adapted to engage those of the recess, serrations and a spring-detent for regulating the elevation of said standard, and a pad carried on the upper portion of the standard, said serrations and detent being adapted to engage or disengage when the standard is raised or lowered, without manipulation of the detent.

3. A seat-back for drivers' seats comprising a bearing on the rear of the seat, having a downwardly and forwardly extending recess therein, a curved sliding standard mounted in said recess, serrations and an automatic spring-detent to arrest the movement downward of said standard, an adjustable pad on the upper portion of said standard, the standard being adapted to be moved downwardly in said recess from its normal elevated position so as to bring said pad to a level with or below the rim of the seat, and the lower portion of said standard under the seat.

In testimony whereof I affix my signature in presence of two witnesses.

RODNEY H. YALE.

Witnesses:
A. W. KING.
SAM RODGERS